United States Patent
Slabaugh et al.

(10) Patent No.: US 6,930,683 B2
(45) Date of Patent: Aug. 16, 2005

(54) THREE-DIMENSIONAL RECONSTRUCTION METHOD UTILIZING REPROJECTIVE OPTIMIZATION

(75) Inventors: Gregory Gibran Slabaugh, Dunwoody, GA (US); Tom Maltzbender, Palo Alto, CA (US); William Bruce Culbertson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 10/126,677

(22) Filed: Apr. 19, 2002

(65) Prior Publication Data

US 2003/0197699 A1 Oct. 23, 2003

(51) Int. Cl.$^7$ ............................................. G06T 17/00

(52) U.S. Cl. ..................... 345/420; 345/423; 345/424; 345/426; 345/427; 345/582; 345/589; 382/154

(58) Field of Search ................................ 345/420, 419, 345/424, 423, 426, 582, 589, 427; 382/154

(56) References Cited

U.S. PATENT DOCUMENTS

| | | | | |
|---|---|---|---|---|
| 5,070,455 A | * | 12/1991 | Singer et al. | 378/6 |
| 6,363,170 B1 | * | 3/2002 | Seitz et al. | 382/154 |
| 6,373,487 B1 | * | 4/2002 | Culbertson et al. | 345/424 |
| 6,510,241 B1 | * | 1/2003 | Vaillant et al. | 382/154 |

* cited by examiner

Primary Examiner—Kimbinh T. Nguyen

(57) ABSTRACT

A method of operating a data processing system to generate a three-dimensional model of a space from a plurality of measured images of the space. Each measured image includes a view of the space from a corresponding viewpoint. The method divides the space into a plurality of voxels, each voxel being characterized by a location and a color or an indication that the voxel is clear. The method defines a reconstruction of the space by assigning colors and clear values to a set of the voxels. The set is based on at least one linked list of voxels. The reconstruction is characterized by an error value related to the difference between each of the measured images and an image that would be produced by the set of voxels from the corresponding viewpoint as that of the measured image. The colors and clear values are chosen to reduce the error value below a cutoff value.

8 Claims, 4 Drawing Sheets

THREE-DIMENSIONAL RECONSTRUCTION METHOD UTILIZING REPROJECTIVE OPTIMIZATION

FIELD OF THE INVENTION

The present invention relates to image processing, and more particularly, to a method for reconstructing 3-D scenes.

BACKGROUND OF THE INVENTION

Consider a three-dimensional scene consisting of a number of objects in some localized region of space. Software that models the objects from a set of calibrated photographs of the scene is known to the art. The models are typically used to generate a view of the scene, as that scene would appear to a camera placed at a new location.

A typical prior art system is taught in W. B. Culbertson, T. Malzbender, and G. Slabaugh, "Generalized Voxel Coloring," Vision Algorithms Theory and Practice (ICCV 1999 Workshop), Springer-Verlag Lecture Notes in Computer Science Vol. 1883, pp. 100–115, which is hereby incorporated by reference. These systems typically reconstruct a scene by defining a "reconstruction volume" containing the objects. This volume is then divided into volume elements referred to as "voxels", which are the three-dimensional analog of pixels in two-dimensional image processing. If a voxel can be seen in a number of photographs, it is tested to determine if the voxel has the same color in each of the photographs in question. If the voxel has a consistent color, it is assigned that color. If the voxel color is inconsistent between the various views, the voxel is assumed to be clear, i.e., the voxel is not part of any of the objects.

The prior art voxel coloring methods only measure the color consistency of each individual voxel. If the colors measured in the various views for a voxel are within some predetermined error, the voxel is assigned the average of the colors and is made to be opaque. While this approach usually produces a model that resembles the scene, there almost always exist other models that resemble the scene more closely. Since these methods do not directly measure the agreement between the model and the images, it is not surprising that the agreement that is achieved is limited.

In addition, these voxel coloring methods operate by only "carving out" voxels. Prior art methods do not re-test voxels that have been carved out after other voxels have been defined to determine if an interpretation of the voxel as being solid is more consistent with the overall reconstruction.

SUMMARY OF THE INVENTION

The present invention is a method of operating a data processing system to generate a three-dimensional model of a space from a plurality of measured images of the space. Each measured image includes a view of the space from a corresponding viewpoint. The method divides the space into a plurality of voxels, each voxel being characterized by a location and a color or an indication that the voxel is clear. The method defines a reconstruction of the space by assigning colors and clear values to a set of the voxels. The set of voxels is based on at least one linked list in which voxels are intersected by a ray aligned to project upon a specific pixel of a measured image associated with the linked list. Within this set of voxels, at least one indication of color or clarity is changed in the defining of the reconstruction. The reconstruction is characterized by an error value related to the difference between each of the measured images and the images that would be produced by projecting the set of voxels to the corresponding viewpoints of the measured images. The colors and clear values are set so as to cause the error value to be less than a predetermined value.

DETAILED DESCRIPTION OF THE PREFERRED EMBODIMENTS OF THE INVENTION

To simplify the following discussion, the present invention will be explained in terms of two-dimensional drawings whenever possible. Also, the figures show a single object, whereas real scenes will typically consist of many objects. However, it will be apparent that the method discussed may be generalized to three-dimensions. The manner in which the present invention obtains its advantages may be more easily understood with reference to FIGS. 1–2, which are top views of an object 20 that is viewed by a number of cameras shown at 11–18. The space in which object 20 is located is divided into a plurality of voxels. The goal of the voxel coloring algorithm is to create a 3D model of the scene, using only the information contained in the camera images. It does this by assigning a color to all voxels on the surface of the object and marking those outside the object as being clear. It is assumed that the surface voxels are opaque, and hence, any voxels completely within an object (not on the object's surface) are not visible in any view of an object.

Figure 1:
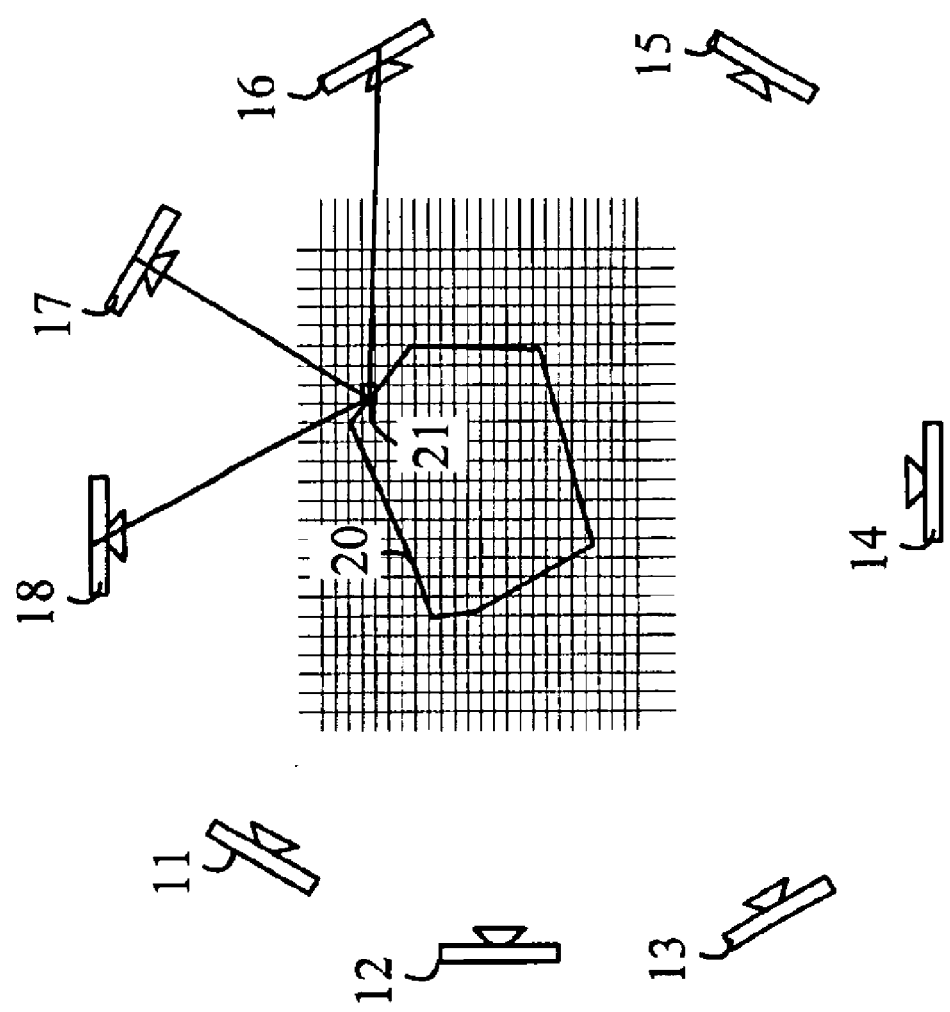
FIGS. 1–2 are top views of an object 20 that is viewed by a number of cameras.

Refer now to FIG. 1. Consider voxel 21, which includes part of the surface of object 20. Cameras 16–18 can see this voxel. The remaining cameras cannot see the voxel because the object blocks the view of that voxel. It is assumed that the position, orientation, and lens characteristics of each of the cameras is known. An image taken with such a camera will be referred to as a calibrated image in the following discussion. Hence, the position on the film or electronic imager of each of the cameras at which light leaving voxel 21 is recorded can be determined, assuming that light is not occluded from the cameras by other voxels. For example, if the image is composed of pixels, then the pixels that view the voxel can be determined using scan conversion, a well-known technique in computer graphics. The color of that light is ascertained from each of the images.

In prior art voxel carving algorithms, the consistency of the color seen at pixels that view the same voxel is used to determine whether the voxel is clear or opaque without reference to the effect such a decision has on the overall model of the scene. These modes assume that the light leaving voxel 21 and arriving at each of the cameras comes from the small region of the surface of object 20 that is within the voxel, each camera will record the same color light, and the views are defined to be consistent with the object having that color at that location. If the views are consistent, these models define the voxel to be opaque and assign it a color consistent with that seen by the various cameras.

Figure 2:
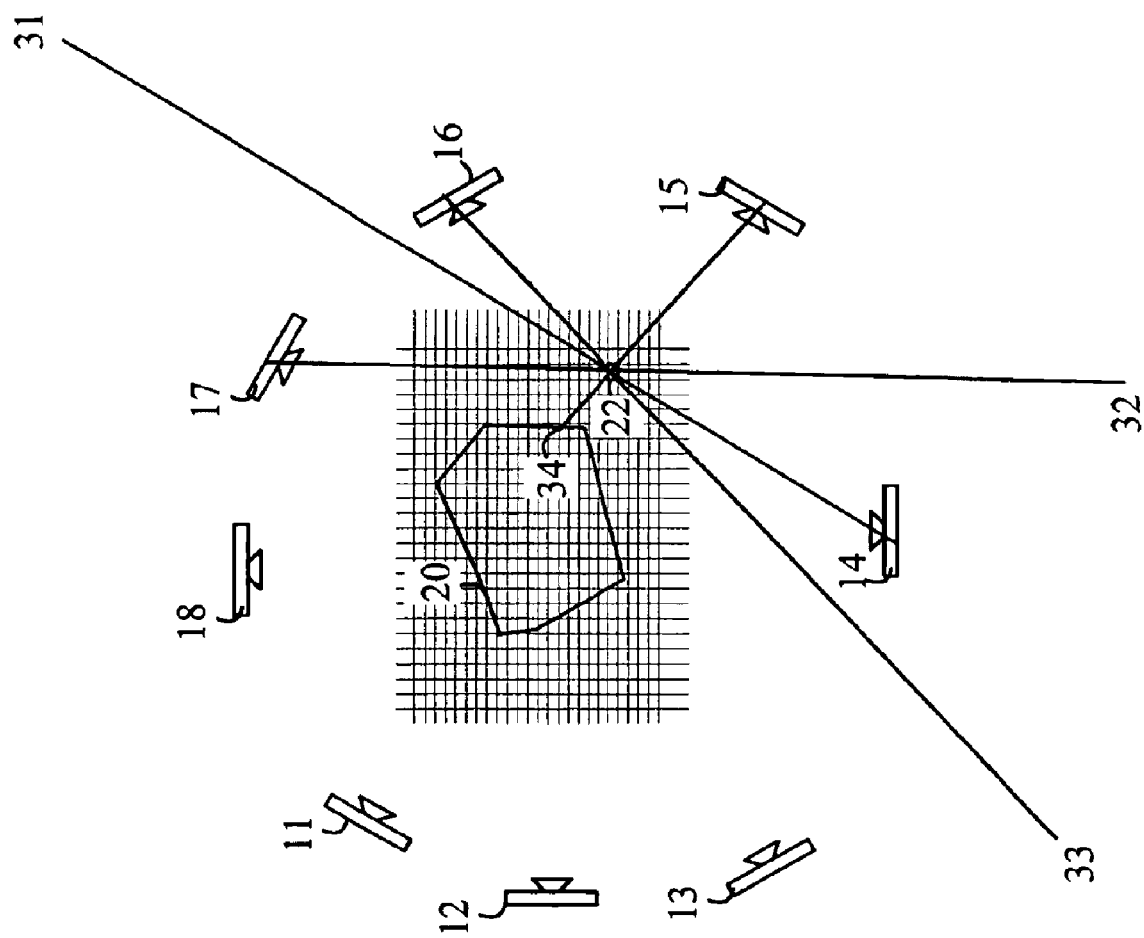

Refer now to FIG. 2 and specifically voxel 22, which lies outside of object 20. Cameras 14–17 can see this voxel.

Since no light originates in this voxel, each camera sees light that is generated from a point beyond the voxel. For example, camera 14 receives light that arrives from location 31, camera 15 receives light from point 34 on object 20, camera 16 receives light that arrives from location 33, and camera 17 receives light that arrives from location 32. Since each light source is at a different location, the colors recorded are expected to differ in at least one of the views, and hence, are inconsistent with a surface at that voxel. Accordingly, prior art voxel carving algorithm would define voxel 22 as being empty, i.e., clear with regard to whether that decision generated a better or worse model of the scene when all of the voxels of the model are taken into account.

The views seen by the cameras of any given voxel on the surface of an object will differ slightly due to differences in the cameras. In addition, each camera views the voxel from a different angle. The amount of light that is scattered from the voxel into a camera will often depend on the position of the camera relative to the voxel. This further increases the variation in the observed color and intensity seen by the different cameras. To accommodate these variations, the voxel carving algorithms define two views of a voxel to be consistent if the colors match within some predetermined tolerance. As a result, some errors are made in the assignment of voxels as being solid. Similarly, a voxel on a surface that has an anisotropic scattering profile that depends on the wavelength of the light being scattered may be defined to be empty because the colors received by the different cameras do not match within the predetermined tolerance.

The present invention overcomes these problems by utilizing an algorithm that tests the overall quality of the voxel assignments. Prior art systems assign a voxel as clear or opaque based on a comparison of the pixels that "view" the voxel in question without regard to how that voxel's assignment alters the assignment of other voxels in the model. However, when a voxel is changed from clear to solid or vice versa, the view from other pixels is altered as well. Refer again to FIG. 2. Consider the case in which voxel 22 is mistakenly defined as being solid because the light seen by the cameras from the direction defined by voxel 22 happens to be within the predetermined tolerance of the same color. This mistake causes additional errors, since other voxels are no longer visible from camera 15 if voxel 22 is solid. For example, voxel 34 will no longer be visible from camera 15. In addition, some of the voxels that are close to voxel 34 will also be blocked from view by voxel 22, and hence, will not be tested with respect to the image taken by camera 15.

The present invention utilizes an overall error function to measure the degree to which a particular assignment of voxels as opaque or transparent reproduces the observed photographs. The present invention starts from an approximate reconstruction of the scene and then improves that reconstruction by testing various voxels to determine if a change in the assignment of a voxel as opaque or transparent improves the overall reconstruction as judged by this error function. To simplify the following discussions, denote a volumetric reconstruction of the scene by V. V is equivalent to a list of each voxel in the scene that can be seen and the colors that are assigned to those voxels. The error function will be denoted by E(V).

The preferred error function has five properties. First, the function should incorporate information from all available viewpoints. Second, the function should weight the error so that viewpoints that have more visibility (i.e. see more pixels of V 's projection) have a greater contribution to the error. Third, the error function should be minimized by the true scene, $V_T$, so that $E(V_T) \leq E(V)$ for all volumetric reconstructions, V. Fourth, the function should provide a relative ordering of solutions, so as to rank the quality of reconstructions. If the volumetric reconstruction $V_1$ is a better solution than $V_2$, then $E(V_1) < E(V_2)$. Finally, the function should be relatively simple to compute.

Given any reconstruction, V, the "picture" that would be taken of V by any given camera can be computed. This picture will be referred to as a "reprojection" of V into the camera in question. Denote the reprojection of V into the $i^{th}$ camera by $R_i$. In general, $R_i$ is a two-dimensional array of color values. However, to simplify the following discussion, the pixels, and their corresponding color vectors, will be denoted by a single subscript j. There are many possible color representation schemes. To simplify the following discussion, the conventional RGB representation will be utilized; however, it will be apparent that the method of the present invention will operate using any of the other color representation systems. That is, any given pixel in the reproduction corresponds to a vector $(R_i(j).r, R_i(j).g, R_i(j).b)$ for some value of j between 1 and $M_i$, where $M_i$ is the number of pixels in the image plane of the $i^{th}$ camera that view voxels in V. Here, the individual components of the vectors are the red, green and blue color values associated with the pixel in the reprojection. The corresponding pixels in the image actually generated by the $i^{th}$ camera will be denoted by $(P_i(j).r, P_i(j).g, P_i(j).b,)$, for j from 1 to $M_i$.

A suitable error function that satisfies the above constraints is given by $$E(V) = \sum_{i=1}^{N} \sum_{j=1}^{M_i} [(P_i(j) \cdot r - R_i(j) \cdot r)^2 + (P_i(j) \cdot g - R_i(j) \cdot g)^2 + (P_i(j) \cdot b - R_i(j) \cdot b)^2]/M_T$$

where, $$M_T = \sum_{i=1}^{N} M_i$$

Here, N is the number of images, i.e., the number of cameras and $M_i$ is the number of pixels used in the comparison for the $i^{th}$ image. This reproduction error is the average squared Euclidian distance in (RGB) color space between $R_i$ and $P_i$. In the preferred embodiment of the present invention, pixels in images that do not view voxels in the volume being modeled are omitted. Hence, the preferred embodiment of the present invention does not attempt to model the background of the model.

For the purposes of the present discussion, a "coloring of the voxels" will be defined to be an assignment of colors and clear values to the various voxels that make up the region of space that is being modeled. Voxels that are assigned a color are opaque.

Given a coloring of the voxels, a lengthy computation is required to calculate the error value. Even in the case that a coloring is given and its corresponding error value is known, if the values assigned to one voxel are changed, a lengthy calculation can be required to calculate the new error value. This is because when the opacity of one voxel is changed, other far distant voxels may become visible or obscured from the viewpoint of one of the measured images. Identifying these distant voxels is difficult. Since millions of changes to voxel values are typically made during a reconstruction, the method would be prohibitively slow without an efficient means to incrementally update the error value from a previously known value. To make efficient incremental updates to the error value, the method of the present invention preferably utilizes a plurality of linked lists for at least one of the measured images. Each linked list is associated with a corresponding one of the pixel values in that measured image. The method utilized in the present invention is based on the observation that for every image pixel on each of the measured images, there is an infinite ray in space that projects to that pixel. Objects intersecting the ray are visible from the pixel if not occluded by a closer object. The linked list includes an entry for each voxel that is on the surface of the current model and that intersects the ray that corresponds to the pixel. The entries in the linked lists are ordered by the distance of the voxels from the viewpoint corresponding to that one of the measured images. When enough voxels are removed from the model (i.e. made transparent) to create a hole through a solid in the model, the linked lists make it possible to efficiently identify the distant voxels that become visible through the hole. Similarly, the linked lists are useful when enough voxels are removed from a surface to, in effect, move the surface and make distant voxels become visible.

Given a reconstruction V1, the present invention attempts to find a new reconstruction V2 such that E(V2)<E(V1). As will be explained in more detail below, if V2 differs from V1 by a small number of voxels, the difference between the error function values can be computed without actually recalculating the entire error function. Hence, this error function computation is not computationally intensive. In the preferred embodiment, the new reconstruction V2 is obtained from the earlier reconstruction V1 by making objects in the earlier reconstruction either larger or smaller. Objects are made larger by adding voxels to them. Specifically, one or more voxels that were transparent and adjacent to the surface of the object in V1 are changed to opaque and colored in V2. Similarly, objects are made smaller by removing voxels from them. Specifically, some voxels that were on the surface of the object in V1 are changed to transparent in V2.

Figure 3:
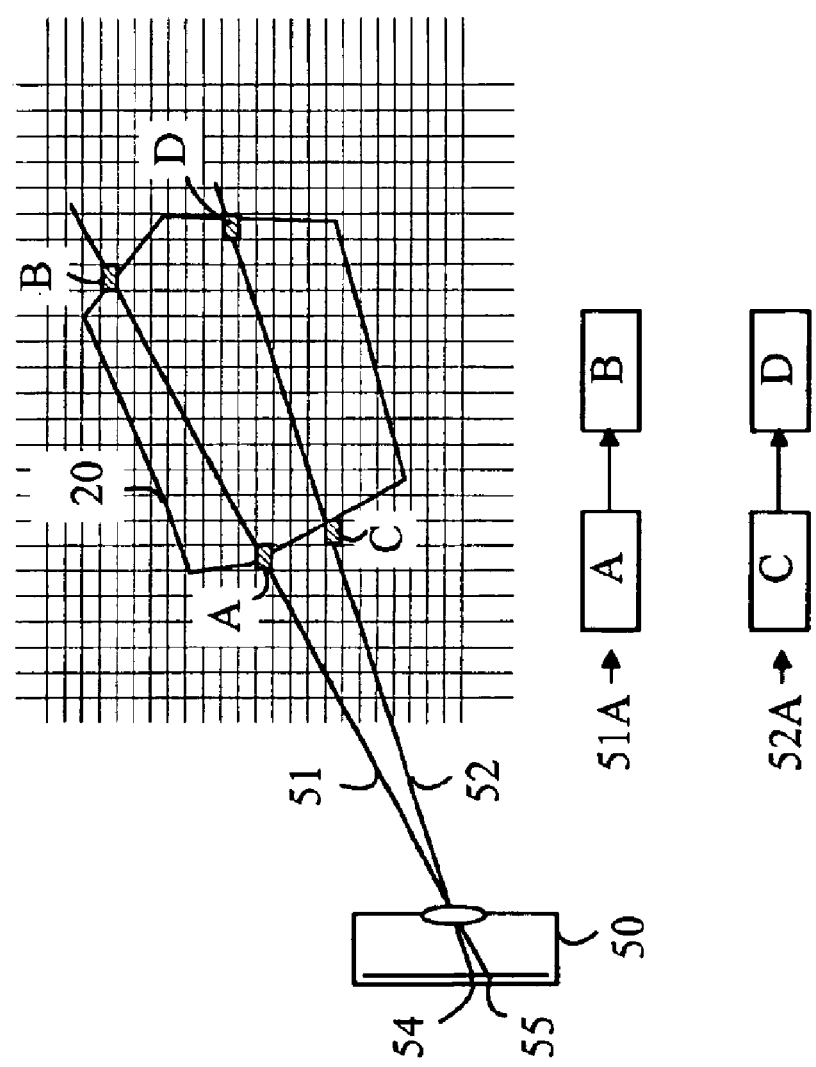
FIG. 3 illustrates the manner in which the linked lists are generated for each camera.

As noted above, the present invention utilizes a linked list system to reduce the computational workload inherent in re-evaluating the error function for each new choice of voxel colors. Refer now to FIG. 3, which illustrates the manner in which the linked lists are generated for each camera. To simplify the computations, each pixel on the film in camera 50 is replaced by a point at the center of the pixel. Each such point defines a ray. For example, pixel 55 defines a ray 51 that passes through all of the voxels in object 20 that can illuminate pixel 55. The two voxels on the surface of object 20 that can illuminate pixel 55 are shown at A and B. These voxels are included in the linked list shown at 51A. Similarly, pixel 54 defines a ray 52 that passes through voxels C and D. These voxels are included in the linked list shown at 52A.

The rays defined by the pixels in the image plane of each camera are used to define linked lists. Each linked list is an ordered list of the voxels on the surface of the objects in the current model of the scene that the ray passes through. The entries in the list specify the voxel and the next entry in the list. The location and color of the voxel are preferably stored with the voxel to reduce the storage. A voxel generally will be visible from multiple pixels; hence, the location and color would be stored multiple times if this information were in the linked lists. Given these linked lists, the error function E(V) for a reconstruction V can be easily computed by using the color assigned to the voxel specified by the first entry in each list. While the computation of E(V) is straightforward, it is computationally intensive, and hence, slow. The linked lists discussed above allow one to compute a new E(V) from a knowledge of E(V') quickly if E(V') is known and V' differs from V at only a few voxels. That is, to compute the contribution to the error function from pixel 55, the color of pixel 55 is subtracted from the color of the voxel specified by the first entry in the linked list associated with this pixel, i.e., voxel A.

Figure 4:
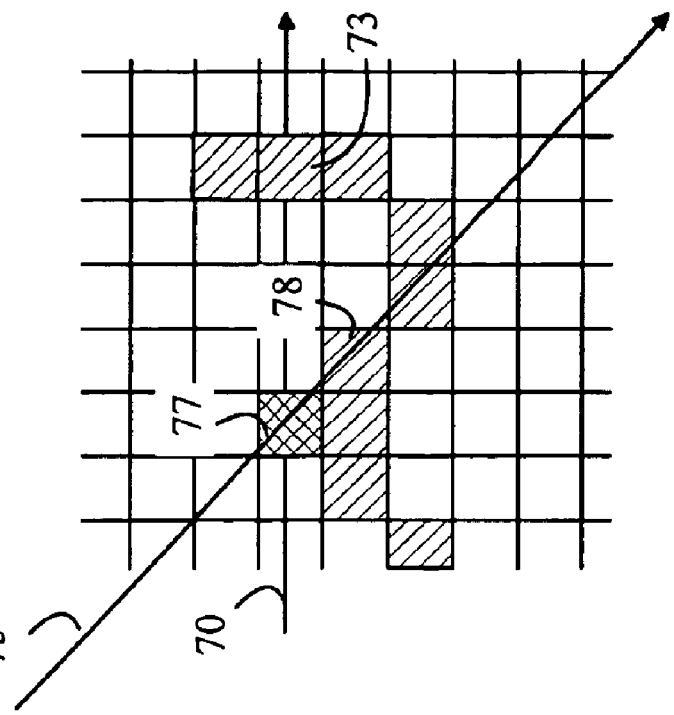
FIGS. 4 and 5 illustrate the manner in which a reconstruction is tested to determine if a new voxel should be added to the reconstruction.
Figure 5:
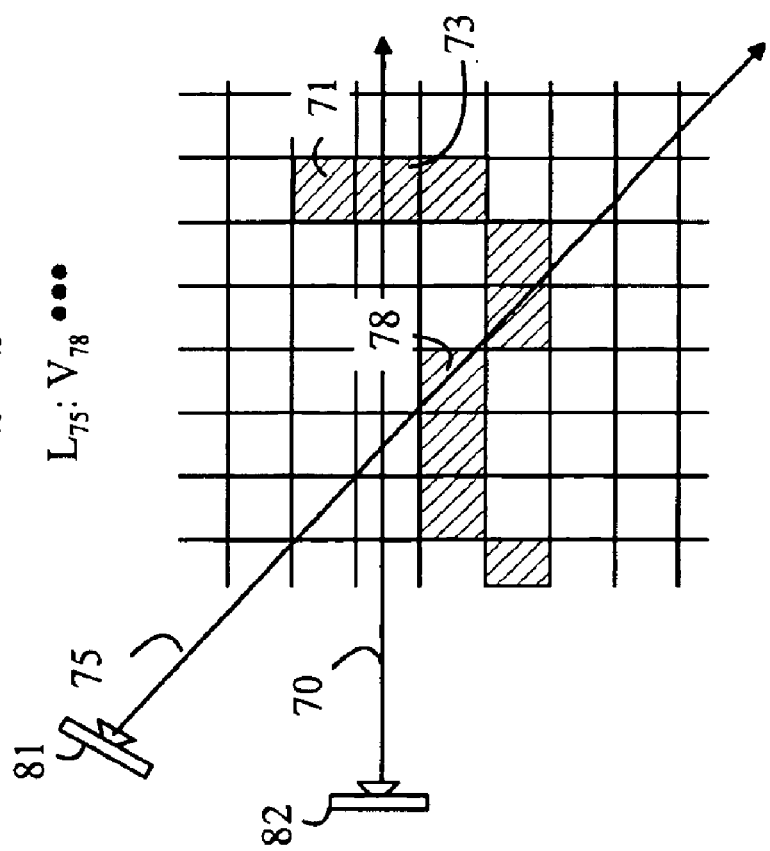

Refer now to FIGS. 4 and 5, which illustrate the manner in which a reconstruction is tested to determine if a new voxel should be added to the reconstruction. The starting reconstruction is shown in FIG. 4. The voxels on the surface of an object are shown cross-hatched. Exemplary voxels are labeled at 71 and 73. In general, each voxel may be seen from a number of cameras. Furthermore, since the voxels have finite volumes, each voxel may contribute to more than one pixel in each of the cameras that can view that voxel. However, to simplify this discussion, it will be assumed that only two cameras can view the portion of the reconstruction in question. And, to further simplify the discussion, only the rays shown at 70 and 75 will be considered. The cameras are shown at 81 and 82 in FIG. 4.

In this example, a new voxel 77 is to be tested to determine whether it should be changed from clear to a solid color. The rays from cameras 81 and 82 that pass through voxel 77 are shown at 75 and 70, respectively. The linked lists associated with rays 70 and 75 are denoted by $L_{70}$ and $L_{75}$ in the figures.

A color must be assigned to voxel 77 before the change in the error function resulting from adding this voxel can be computed. In the preferred embodiment of the present invention, the color assigned to voxel 77 is the average of the colors of the pixels on the films in the cameras 81 and 82 at the points on the film at which rays 75 and 70 intersect the film, respectively, whether or not these colors meet any consistency criterion. As noted above, the voxel will usually be visible from more than one pixel in each image.

To simplify the following discussion, colors will be denoted by vectors having components equal to the intensity in each of the primary color bands. That is, the color of voxel 70 will be denoted by the vector V(70)=(V(70).r, V(70).g, V(70).b). The difference between two colors A and B, denoted |A−B|, is the square root of $(A.r-B.r)^2+(A.g-B.g)^2+(A.b-B.b)^2$.

The addition of voxel 77 changes the two linked lists associated with rays 70 and 75. In particular, each list must be augmented to include voxel 77 as the first entry in each of the lists. The new entries each include a link to the previous voxels that occupied the first positions in each of the lists.

To compute the change in the error function resulting from the addition of voxel 77 to each list, denote the pixel color in the film at ray 70 by P(70). P(70) is a vector having components (P(70).r, P(70).g, P(70).b). Prior to the addition of voxel 77, voxel 73 was the first entry in the linked list corresponding to ray 70. Voxel 73 contributed $|P(70)-V(73)|^2$ to the error function from camera 82. After the addition of voxel 77, the contribution of ray 70 to the error function is $|P(70)-V(77)|^2$. Hence, the change in the error at the pixel corresponding to ray 70 is $|P(70)-V(77)|^2-|P(70)-V(73)|^2$.

Similarly, the addition of voxel 77 to the reconstruction alters the contribution to the error function associated with P(75) in camera 81 from $|P(75)-V(78)|^2$ to $|P(75)-V(77)|^2$. If the sum of all of the changes to the error function obtained by adding voxel 77 is less than zero, the new reconstruction is better than the prior reconstruction, and voxel 77 is retained. If the net change in the error function is positive, voxel 77 is removed from the various linked lists.

In the preferred embodiment of the present invention, the error is normalized and hence the error update is a little more complicated. That is, error function is the sum of all the color differences divided by the number of pixels in the projection of the current model. In this case, an update consists of four steps. First multiply the previous error by the previous number of pixels to get the sum of the previous color differences. Second, subtract the color differences that have changed. Third, add in the new color differences. It should be noted that a pixel that previously saw background might now see a voxel, or vice versa; hence, there is not always a 1-to-1 correspondence between color differences that are subtracted and those that are added. Finally, divide the new sum by the new number of pixels to obtain the new error value. The new value is then compared to the old error value to determine if the new model is better than the old model.

A new reconstruction can also be generated by removing a voxel from an object in the current reconstruction. The removal of one voxel may bring to the surface one or more other voxels that previously were strictly in the interior of the object. The success of the reconstruction depends upon all surface voxels being included in the linked lists. So, when one voxel is removed, all newly created surface voxels must first be added to the linked lists. This can be accomplished by the same means described earlier for adding voxels to the model.

The manner in which a voxel is removed is essentially the reverse of that described above with reference to FIGS. 4 and 5. That is, the starting lists are as shown in FIG. 5. The lists after the removal of voxel 77 are as shown in FIG. 4. In the case of a pixel that previously viewed the removed voxel, the new voxel (if any) that becomes visible from the pixel will already be in the pixel's linked list. In particular, the new voxel will be at the head of the linked list after the removed voxel is "popped" from the list. The newly visible voxel could be a new surface voxel, as described in the previous paragraph. It could also be a voxel that is far away from the removed voxel, for example voxel 73 that becomes visible from the pixel associated with ray 70 when voxel 77 is removed. In either case, the voxel is assigned a new color equal to the average color projected by the voxel into each camera. The change in the error function is then computed to determine whether to keep the new reconstruction. The linked lists make it easy to identify a distant voxel that becomes visible as the result of removing another voxel and also make it easy to update the error function. Without the linked lists, identifying the distant voxel would be a computationally intensive process.

In general, the preferred embodiment of the present invention starts from an approximate reconstruction of the scene obtained by using a conventional voxel coloring algorithm or any other scene reconstruction method. Since such algorithms tend to produce reconstructions that include additional solid voxels (i.e. the reconstructed surfaces tend to be closer to the cameras than the actual surfaces), the preferred embodiment of the present invention starts by testing the currently solid surface voxels to determine if the error function is reduced by removing any of these voxels from the reconstruction. After all of the voxels that can be removed are removed, the present invention tests the various reconstructions that can be obtained by adding voxels that are adjacent to the current surface voxels. It should be noted that, in general, a voxel is a surface voxel in the current reconstruction if that voxel is the first entry in at least one of the linked lists associated with one of the cameras. This two-pass algorithm can then be repeated to further improve the reconstruction until the error function value no longer decreases or until the error function value is reduced below some predetermined threshold value.

It should be noted that the error function could include local minimums that are far from the optimal reconstruction. Since the above algorithm only accepts a change if the change lowers the overall error function value, the algorithm can become trapped in one of these local minimums. In essence, the above-described search algorithm will only find a new minimum in the error function if that new minimum is connected to the starting point by a path consisting of one-voxel changes in which each change reduces the error function.

Search algorithms that avoid such local minimum traps are known to the art. One such search algorithm is referred to as "simulated annealing". In this type of algorithm each change that produces an improvement in the error function is still accepted. In addition, a change that actually increases the error function is occasionally accepted. The probability with which a change that increases the error function by $\Delta E$ is accepted is given by $p=\exp(-\Delta E/T)$ where T is a parameter that is varied during the process. Initially, T is set to a relatively high value, and a significant number of changes that actually have a worse fit are accepted. Each such change causes the solution to "jump" to a different point on the error function surface in the hope that this point is outside the region dominated by a local minimum. As the algorithm proceeds, T is lowered until p becomes effectively zero.

The above-described embodiments of the present invention have been discussed in terms of "pictures" of the scene as taken by a plurality of cameras. However, the present invention can be practiced with any form of projection of the three-dimensional scene to form a plurality of two-dimensional scenes. Each of the two-dimensional scenes have a plurality of pixels in which each pixel represents the light leaving the three-dimensional scene in a specific direction as viewed by an imaging device at a fixed location.

Various modifications to the present invention will become apparent to those skilled in the art from the foregoing description and accompanying drawings. Accordingly, the present invention is to be limited solely by the scope of the following claims.

What is claimed is:

1. A method of operating a data processing system to generate a three-dimensional model of a space from a plurality of measured images of said space, each measured image comprising a view of said space from a corresponding viewpoint, each measured image comprising a plurality of pixels having pixel values, said method comprising:

dividing said space into a plurality of voxels, each voxel being characterized by a location and an indication of an opaque color or an indication that said voxel is clear, including basing said indications upon said measured images so as to generate a first model of said space; and defining a reconstruction of said space by assigning characterizations to a set of said voxels of said first model, said set being based on at least one linked list of said voxels in which said voxels of any particular said linked list are intersected by a ray aligned to project upon a specific pixel of a specific said measured image having an association with said particular linked list, said reconstruction being characterized by an error value related to the difference between each of said measured images and a reprojection that would be produced by said set of voxels from the corresponding viewpoint as that of said measured image, said assigning including changing at least one said indication of opaque color or clear within said set of voxels, wherein changes of colors and clear values of said assigned characterizations are chosen to reduce said error value below a cutoff value.

2. The method of claim 1 wherein said error value increases monotonically with the difference between each of said measured images and said images that would be produced by said set of voxels.

3. The method of claim 1 wherein said error value depends of each of said measured images.

4. The method of claim 1 wherein said color value of one of said voxels is related to the average color of a plurality of said pixels from different ones of said measured images.

5. The method of claim 1 wherein the step of defining a reconstruction comprises:

defining a first trial reconstruction by reassigning color values to a first set of said voxels having said clear values, said first trial reconstruction being characterized by a first error value related to the difference between each of said measured images and reprojections that would be produced by said first set of voxels from the corresponding viewpoints as those of said measured images;

defining a second trial reconstruction by changing the color value of at least one of said voxels in said first set of voxels to generate a second set of voxels, said second trial reconstruction being characterized by a second error value related to the difference between each of said measured images and reprojections that would be produced by said second set of voxels from the corresponding viewpoints as those of said measured images; and replacing said first trial reconstruction with said second trial reconstruction if said first error value is greater than said second error value.

6. The method of claim 1 wherein said entries in said linked lists are ordered by the distance of said voxels from said viewpoint corresponding to said one of said measured images.

7. A method of operating a data processing system to generate a three-dimensional model of a space from a plurality of measured images of said space, each measured image comprising a view of said space from a corresponding viewpoint, each measured image comprising a plurality of pixels having pixel values, said method comprising:

dividing said space into a plurality of voxels, each said voxel being characterized by a location and being assigned a value indicative of one of clarity or a color, said values being based on said measured images to define a first model of said space, wherein voxels assigned values indicative of color are solid surface voxels;

defining a plurality of second models of said space in at least two passes, said passes including:
(a) a removal pass in which selected said solid surface voxels are changed to be assigned said indication of clarity; and
(b) an adding pass in which particular said voxels having said indication of clarity are assigned an indication of color, said particular said voxels being selected on a basis of being next to said solid surface voxels as determined from linked lists of voxels, wherein each voxel in a particular linked list is intersected by a ray aligned to project upon a specific pixel of a specific said measured image having an association with said particular linked list;

determining an error value for each said first and second model, said error values being based upon reprojections of said indications of clarity or color to said viewpoints; and selecting among said first and second models based upon said error values.

8. The method of claim 7 wherein said selecting among said first and second models includes terminating processing for defining said second models upon detecting that one of said second models has a determined error value that is less than a predetermined threshold value.

* * * * *